Dec. 11, 1923.   1,476,714
P. G. HILDEBRANDT
BURNER FOR UTILIZING MOLASSES AS A FUEL
Filed Oct. 13, 1920   2 Sheets-Sheet 1
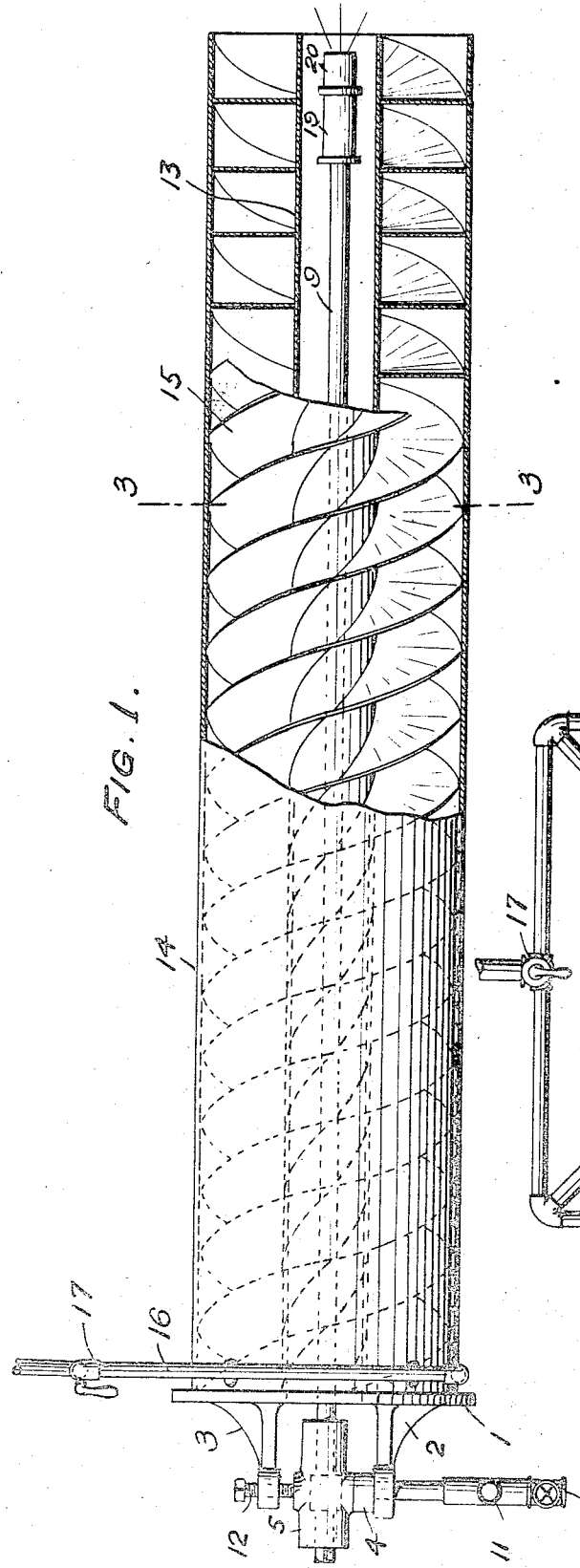
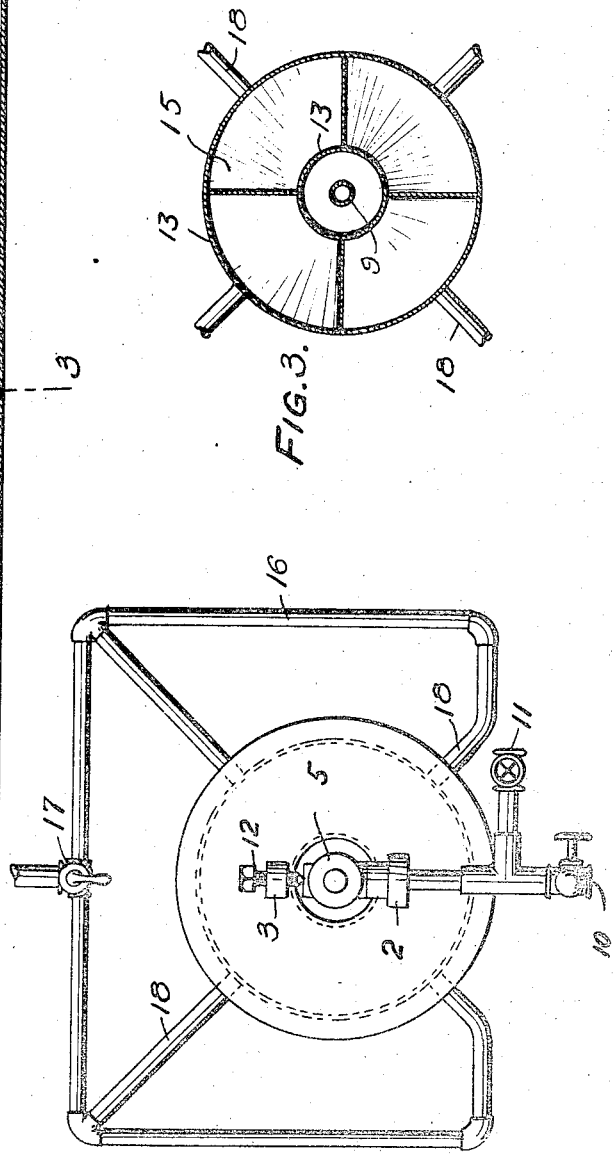
INVENTOR
Paul G. Hildebrandt

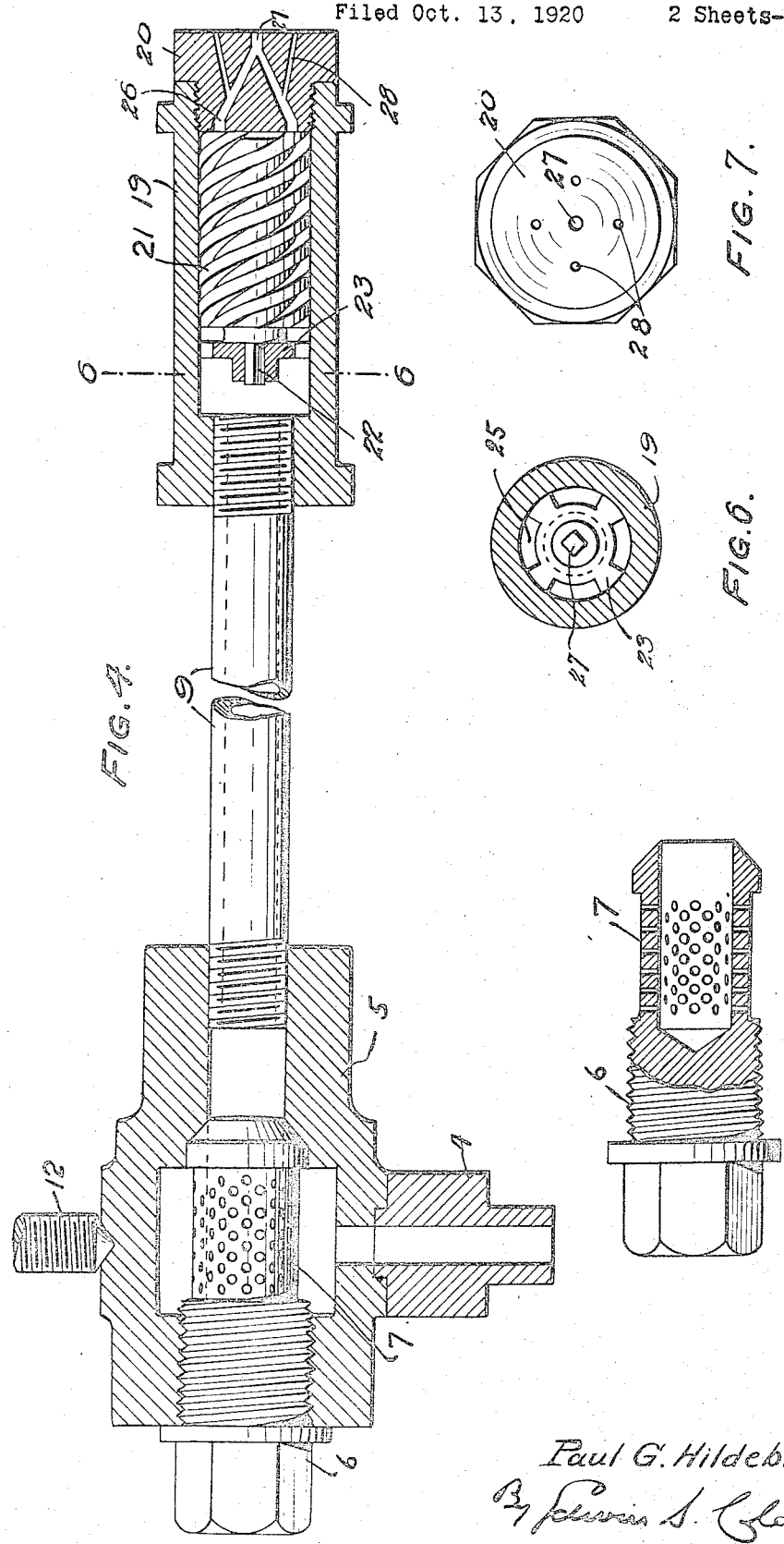

Patented Dec. 11, 1923.

1,476,714

UNITED STATES PATENT OFFICE.

PAUL G. HILDEBRANDT, OF PHILADELPHIA, PENNSYLVANIA, ASSIGNOR TO BLACK-STRAP FUEL AND POTASH PRODUCTS COMPANY, A CORPORATION OF DELAWARE.

BURNER FOR UTILIZING MOLASSES AS A FUEL.

Original application filed June 26, 1919, Serial No. 306,304. Divided and this application filed October 13, 1920. Serial No. 416,642.

*To all whom it may concern:*

Be it known that I, PAUL G. HILDEBRANDT, a citizen of France, residing at Philadelphia, in the county of Philadelphia and State of Pennsylvania, have invented certain new and useful Improvements in Burners for Utilizing Molasses as a Fuel, of which the following is a specification.

The object of my invention is to provide a burner especially adapted to burn molasses as a fuel after the molasses has been treated by a process fully described in several of my applications the burner herein shown being illustrated and described in my application filed June 26th, 1919, Serial No. 306,804, of which this is a divisional application.

In the drawing:

Figure 1 is a longitudinal view of the whole burner partly broken away.

Figure 2 is an end view of the burner.

Figure 3 is a sectional view on the line 3—3 Figure 1.

Figure 4 is a longitudinal sectional view of the burner showing the filter, burner tube and pulverizer.

Figure 5 is a detail sectional view of the filter.

Figure 6 is a sectional view on the line 6—6, Figure 4.

Figure 7 is an end elevation of the discharge nozzle of the pulverizer.

The burner is provided with an end head 1, which is provided with brackets 2, 3. The bracket 2 has a head which supports a block 4, having a central channel. On the block 4 rests a casing. This casing has at one end a screw threaded opening for the reception of a screw threaded plug 6 carrying a filter 7. The filter comprises a perforated tubular member having a conical end which engages a conical seat 8 in the casing. The other end of the casing has a somewhat contracted threaded opening to receive the burner tube 9.

The pipe 10 from a superheater, not shown, connects with the channel in the block 4 and has a valve controlled steam inlet pipe 11.

The bracket 3 has a threaded head to receive a screw 12 engaging the filter casing 5.

The superheated molasses is carried to the filter 7, air being blown into the pipe 10 at a point comparatively close to the filter. The molasses passing through the filter enters the burner tube 9.

Surrounding the burner tube 9 and concentric therewith are an inner cylinder 13 and an outer cylinder 14, a spiral 15 being arranged between the two cylinders. In front of the end head 1 is a header 16 into which air under pressure is admitted through the valve 17. The header 16 has branches 18 communicating with the space within the spiral.

The burner tube 9 terminates near the front end of the cylinder 13, and is threaded into an opening in the casing 19 of the pulverizer. The front end of the casing 19 is closed by a nozzle 20 back of which nozzle is a block 21 in which are formed four spiral grooves. The rear end of the block 21 carries a square shank 22, which extends through the neck of a partition 23 secured within the casing 19, whereby block 21 is held against rotation. The partition 23 has four peripheral recesses 25 which communicate with the space in the casing 19 at the end of the burner tube and also with the entrances to the several spiral grooves of the block 21. The four spiral grooves communicate, at their front ends with four channels 26 in the nozzle 20 which channels merge into a common outlet 27. Four other discharge passages 28 communicate with the respective channels 26.

The molasses from the pulverizer impelled by air entering the flowing current is sprayed into a suitable combustion chamber where it mixes with the air discharged from the cylinder 14 and ignites and burns as freely as fuel oil.

The length of the burner is made necessary by the fact that, in the combustion chamber of sugar refining furnaces, the point of ignition is preferably at a substantial distance from the opening of the combustion chamber. The envelope of air flowing about the burner tube 14 protects the molasses from the direct heat of the furnace, besides furnishing the air required to form the most desirable combustible mixture.

What I claim is:

1. In a burner for molasses fuel, the combination with a burner tube having an inlet and an outlet, an inner cylinder and an outer cylinder surrounding and concentric with and extending throughout the length of the burner tube, a spiral plate between and extending throughout the length of the two cylinders, said cylinders constituting an air chamber surrounding the burner and opening at the discharging end of the burner tube, whereby the molasses fuel flowing through said tube is protected by the air in said chamber from the direct heat of the furnace, in which the burner is positioned, and whereby air is discharged from such chamber and mixes at the discharging end of the burner tube with molasses and is burned therewith.

2. In a burner for molasses fuel, the combination with a burner tube having an inlet and an outlet, an air chamber surrounding said tube and permanently open to atmosphere at one end, a spiral, a fuel pulverizer and burner secured to said tube and comprising a casing, a spirally grooved block fixedly secured in said casing, a burner nozzle secured in one end of the casing, ports in said nozzle registering with the grooves in the block and merging into a common outlet, and additional ports in said nozzle leading from the first mentioned ports.

In testimony whereof I affix my signature.

PAUL G. HILDEBRANDT.